(12) United States Patent
Speck et al.

(10) Patent No.: US 9,242,579 B2
(45) Date of Patent: Jan. 26, 2016

(54) SEAT RAIL FOR A MOTOR VEHICLE SEAT

(75) Inventors: Axel Speck, Haan-Gruiten (DE); Daniel Urban, Düsseldorf (DE); Robert Landskron, Monheim (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 299 days.

(21) Appl. No.: 13/978,371

(22) PCT Filed: Nov. 29, 2011

(86) PCT No.: PCT/EP2011/071267
§ 371 (c)(1),
(2), (4) Date: Oct. 15, 2013

(87) PCT Pub. No.: WO2012/093002
PCT Pub. Date: Jul. 12, 2012

(65) Prior Publication Data
US 2014/0374560 A1    Dec. 25, 2014

(30) Foreign Application Priority Data
Jan. 4, 2011    (DE) .......................... 10 2011 002 441

(51) Int. Cl.
*B60N 2/07* (2006.01)
*B60N 2/06* (2006.01)

(52) U.S. Cl.
CPC .............. *B60N 2/0722* (2013.01); *B60N 2/067* (2013.01)

(58) Field of Classification Search
CPC ....... B60N 2/072; B60N 2/067; B60N 2/0715
USPC ........................................................ 248/429
See application file for complete search history.

(56) References Cited

U.S. PATENT DOCUMENTS 6,260,922 B1    7/2001  Frohnhaus et al.
7,571,666 B2 *  8/2009  Borbe et al. ................ 74/606 R
(Continued)

FOREIGN PATENT DOCUMENTS

CN    1898104 A      1/2007
DE    12 84 168 A   11/1968
(Continued)

OTHER PUBLICATIONS

Office Action issued in Japanese Patent Application No. 2013-547829 mailed Aug. 12, 2014 (with translation).
(Continued)

*Primary Examiner* — Jeanette E Chapman
*Assistant Examiner* — Daniel Kenny
(74) *Attorney, Agent, or Firm* — Foley & Lardner LLP

(57) ABSTRACT

A seat rail for a motor vehicle seat includes a lower rail, which can be connected to a motor vehicle, and a spindle, which is arranged on the lower rail in a rotationally fixed manner by a spindle retainer. The spindle retainer is fastened to the lower rail by a fastening element extending through a fastening opening on the spindle retainer and a fastening opening on the lower rail. In order to provide a seat rail having a lower rail on which rotation of the spindle retainer is largely precluded, in particular in the event of a threaded floor connection extending through the spindle retainer, the fastening openings and/or the fastening element has a cross-section deviating from a circular shape, preferably a polygonal cross-section, in a connection section arranged in the region of the fastening openings.

9 Claims, 6 Drawing Sheets

(56) References Cited

U.S. PATENT DOCUMENTS

| | | | |
|---|---|---|---|
| 7,597,303 B2* | 10/2009 | Kimura et al. | 248/429 |
| 7,669,824 B2 | 3/2010 | Woehrle et al. | |
| 8,540,203 B2* | 9/2013 | Ruess et al. | 248/429 |
| 2006/0158002 A1 | 7/2006 | Long | |
| 2006/0249644 A1* | 11/2006 | Folliot et al. | 248/429 |

FOREIGN PATENT DOCUMENTS

| | | |
|---|---|---|
| DE | 196 39 007 A1 | 3/1998 |
| DE | 202005 00 317 U1 | 5/2005 |
| DE | 102004 01 624 B3 | 9/2005 |
| DE | 102006 22 947 B3 | 9/2007 |
| EP | 1 373 742 A1 | 1/2004 |
| EP | 1 701 861 A1 | 9/2006 |
| GB | 0 931 839 | 7/1963 |
| JP | 11-001136 | 1/1999 |
| JP | 11-001136 A | 1/1999 |
| JP | 2004-106713 A | 4/2004 |
| JP | 2005-254832 A | 9/2005 |
| JP | 2010-179688 A | 8/2010 |
| WO | WO-02/081936 A1 | 10/2002 |
| WO | WO-2005/065989 A1 | 7/2005 |

OTHER PUBLICATIONS

Second Office Action dated Dec. 26, 2014, in corresponding Korean Application No. 2013-7020687, 4 pages.

Office Action dated Mar. 26, 2015 in corresponding Chinese application No. 201180064093.9, 8 pages.

International Search Report in PCT/EP2011/071267 dated Feb. 29, 2012.

International Preliminary Report on Patentability and Written Opinion received in International Application No. PCT/EP2011/071267 dated Jul. 18, 2013.

* cited by examiner

SEAT RAIL FOR A MOTOR VEHICLE SEAT

CROSS REFERENCE TO RELATED APPLICATIONS

The present application is a National Stage of International Application No. PCT/EP2011/071267 filed on Nov. 29, 2011, which claims the benefit of German Patent Application No. 10 2011 002 441.7 filed on Jan. 4, 2011, the entire disclosures of which are incorporated herein by reference.

The invention relates to a seat rail for a motor vehicle seat, having
 a lower rail, which can be connected to a motor vehicle,
 a spindle, which is arranged on the lower rail in a rotationally fixed manner by means of a spindle retainer, wherein the spindle retainer is fixed to the lower rail via a fastening element extending through a fastening opening in the spindle retainer and a fastening opening in the lower rail.

Seat rails of the initially named type are known in numerous designs from the prior art. With motor vehicle seats, seat rails serve for adapting the seating position to the respective vehicle user, wherein the motor vehicle seats are generally connected to an upper rail, which can be adjusted with respect to a lower rail arranged fastened to the vehicle, so that the longitudinal position of the vehicle seat can be adapted in the installation position thereof to the personal needs.

Modern motor vehicle seats increasingly have the possibility of a motor-driven adjustment of the motor vehicle seat relative to the lower rail so that the respective user has the possibility to adapt the seating position to his needs in a particularly comfortable manner. Drive units, which have a spindle arranged on a lower rail, have proven particularly useful for the adjustment, where the spindle for the longitudinal adjustment is designed for receiving a driven spindle nut. The functional principle underlying the drive units to some extent requires the spindle to be arranged on the lower rail in a rotationally fixed manner. For this purpose, spindle retainers that receive the spindle and are connected to the lower rail are used preferably.

For fastening the spindle retainer to the lower rail it is known to use fastening bolts, extending through both the spindle retainer and also the lower rail, which along with fastening the spindle retainer to the lower rail also allow fixing the lower rail to the motor vehicle.

During tightening of such threaded floor connections there is however, due to the friction between the fastening bolts and the spindle retainer, a transfer of the tightening torque to the spindle retainer, which can lead to a pivoting of the spindle retainer with respect to the lower rail and as a consequence of which, the spindle bends. A fastening of the spindle retainer using a rivet connection, for example, is not suitable for the purpose of preventing a rotation of the spindle retainer during tightening of a threaded floor connection. A bending of the spindle can, in addition to noise—depending on the degree of bending—furthermore lead to functional impairments, which possibly can also lead to a complete failure of the longitudinal adjustment.

Proceeding from this background, the object of the invention is to provide a seat rail having a lower rail, on which a rotation of the spindle retainer is largely excluded, particularly in the case of a threaded floor connection extending through the spindle retainer.

The object of the invention is achieved by a seat rail having the features of claim 1. Advantageous further developments of the invention are specified in the dependent claims.

The seat rail according to the invention is distinguished in that the fastening openings, provided for fastening the spindle retainer to the lower rail and the spindle retainer, and/or the fastening element have a cross-section deviating from a circular shape, preferably a polygonal cross-section, in a connection section arranged in the region of the fastening openings. According to the invention, the spindle retainer and the lower rail in the installation position thereof have fastening openings running substantially aligned to each other, which are designed for receiving a fastening element penetrating through the fastening openings.

A reliable lock against rotation of the spindle retainer with respect to the lower rail is attained due to the design according to the invention of the fastening openings and/or the fastening element having a cross-section, deviating from a circular shape, preferably a polygonal cross-section. In the case of torque acting on the spindle retainer, caused by a fastening bolt, shifting of the spindle retainer is prevented such that damaging transverse forces acting on the spindle, which lead to a bending of the spindle, can be excluded. The design of the connection section and/or the fastening openings having a cross-section deviating from a circular shape, particularly having a polygonal cross-section, prevents particularly reliably a rotation of the spindle retainer with respect to the lower rail, because hereby relative movements of the spindle retainer are blocked. In particular, a polygonal design of the cross-section with corresponding design of the fastening opening is distinguished here by the particularly secure lock against rotation of the spindle retainer with respect to the lower rail.

The fastening element extending through the fastening openings on the spindle retainer and lower rail can basically be formed in any manner. According to a particularly advantageous design of the invention, the fastening element is formed, however, using a connection rivet, the cross-section of which in the connection section, that is, the region of the fastening element, which in the installed state is arranged within the fastening openings, is adapted to the cross-section of the fastening openings. The connection rivet can be installed very easily and thus allows very economical production of the seat rail. Particularly, the connection rivet can be designed such that it only projects from a surface of the lower rail or the spindle retainer only in a small region such that the connection rivet requires only a very small installation space.

The specific design of the connection section, having a cross-section deviating from a circular shape, preferably a polygonal cross-section, can basically have any shape. However, according to a particular advantageous design of the invention, the connection section of the fastening element has a quadrangular, preferably a pentagonal, particularly preferably a hexagonal cross-section. Fastening elements having connection sections designed in this manner can be produced particularly easily and inexpensively and furthermore, due to the side surfaces thereof, guarantee a particularly reliable lock against rotation of the spindle retainer with respect to the lower rail. Here, the design of a pentagonal, particularly a hexagonal cross-section, has proven particularly useful, whereby a fastening of the spindle retainer to the seat rail with minimal play, or respectively free of play, is possible.

As already explained above, the design of the fastening element is basically freely selectable. According to a particularly advantageous embodiment of the invention, it is provided that a peg is attached to the connection section of the fastening element that in the installed state projects from a side of the lower rail opposite the spindle retainer. According to this design of the invention, the fastening element projects with a section from the side opposite the spindle retainer— generally the lower side of the lower rail. This section, that is, the peg, can be used for positioning the lower rail in the motor vehicle. Here, the peg can serve as a supplemental, or the only, arranging means in order to attain a particularly simple and fast positioning of the seat rail on the floor of the motor vehicle. Thus, particularly in conjunction with further positioning aids and/or a fastening bolt, also a faulty installation of the seat rail can be avoided in a particularly effective manner.

According to a particularly advantageous embodiment of the invention, the peg of the fastening element has a shape tapering toward the free end of the peg and/or a polygonal cross-section. A tapering cross-section facilitates the assembly of the seat rail on the vehicle floor and a polygonal cross-section allows an alignment of the seat rail with respect to the vehicle floor, or respectively prevents rotational movement of the seat rail and thus increases the positioning accuracy.

Basically, the fastening bolt provided for fastening the lower rail to the motor vehicle can extend through the lower rail in any manner. According to a particularly advantageous design of the invention, the spindle retainer and the lower rail each have a second fastening opening arranged aligned to each other in the assembled state which are designed for receiving a fastening bolt for fixing the seat rail to the motor vehicle. A corresponding design guarantees that the fastening bolt is arranged in a region with the lower rail in which due to the material thickness of the spindle retainer, additional material is available that counteracts tearing out particularly in the case of a crash. Due to the use of a fastening element according to the invention, it can be reliably excluded that during tightening of the fastening bolt torque acting on the spindle retainer due to the friction leads to rotation of the spindle retainer which could lead to damaging the spindle.

Depending on the functional principle of the drive unit, the arrangement of the spindle in the spindle retainer occurs either secured against rotation or in a rotatable manner. However, according to a particularly advantageous embodiment of the invention, the spindle retainer has a U-shaped receiving section for receiving the spindle in a manner locked against rotation. A correspondingly designed section for arranging the spindle allows the spindle to be fastened to the spindle retainer locked against rotation in a particularly reliable manner. Here, the free limbs of the U-shaped section enclose the spindle at least in sections and thus reliably prevent a rotation of the spindle with respect to the spindle retainer. Here, the fastening element is also particularly advantageously arranged in the region of the U-shaped receiving region. As a result, the stability of the connection is increased in a supplemental manner, according to which the spindle retainer has a particularly high rigidity. Thus, particularly in the case of a crash it can be particularly effectively prevented that the spindle retainer is torn out with respect to the lower rail.

BRIEF DESCRIPTION OF THE DRAWINGS

In the following, exemplary embodiments of the invention are described with reference to the drawings. In the drawings.

DETAILED DESCRIPTION

Figure 1:
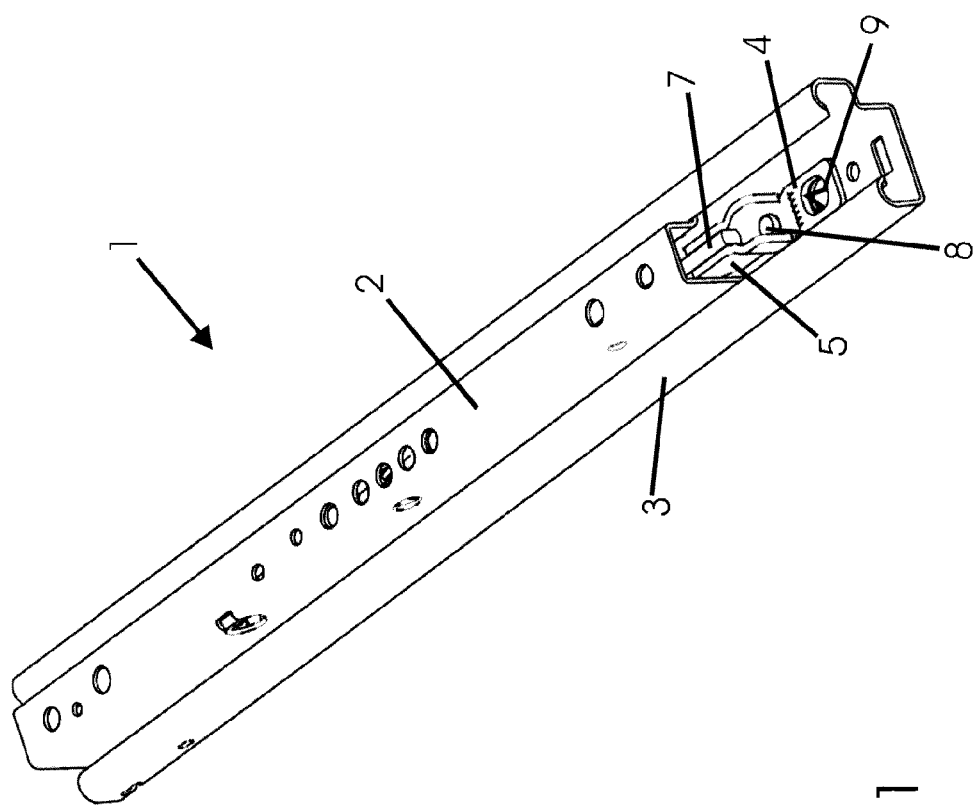
FIG. 1 shows a perspective view of a seat rail.
Figure 2:
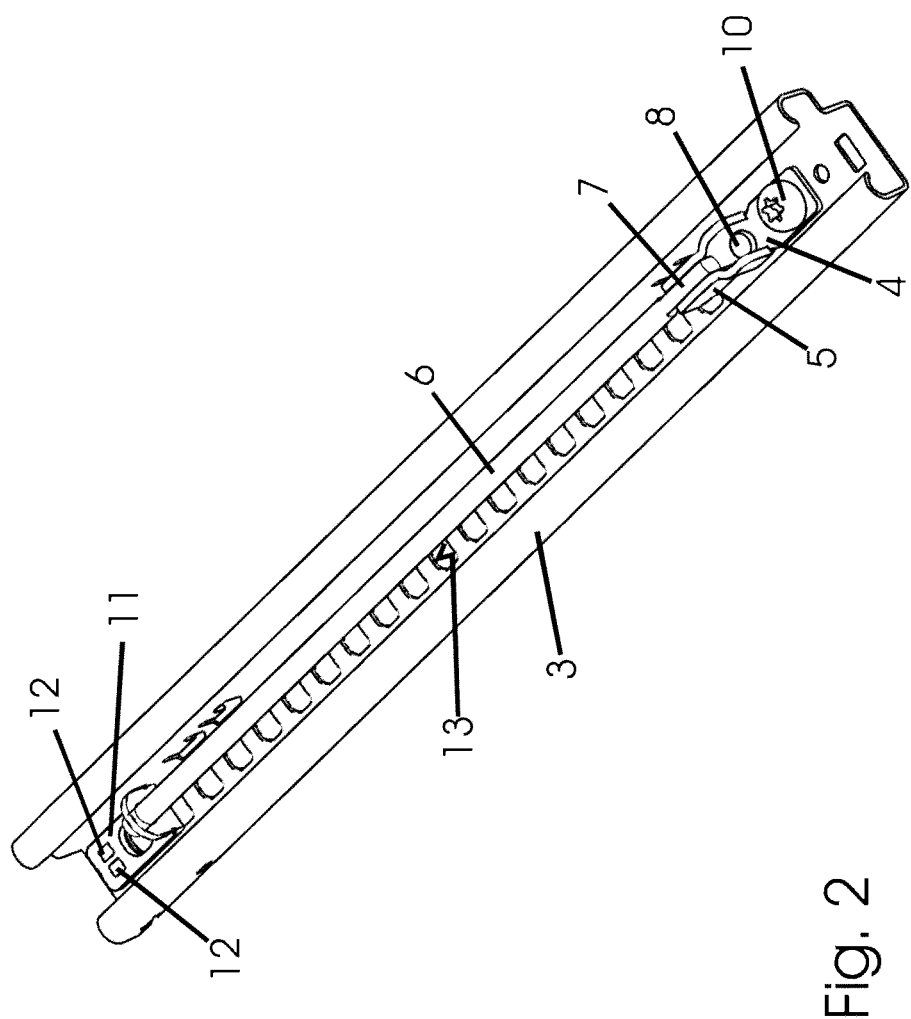
FIG. 2 shows a perspective view of the seat rail from FIG. 1 without the upper rail disposed thereupon.
Figure 3A:
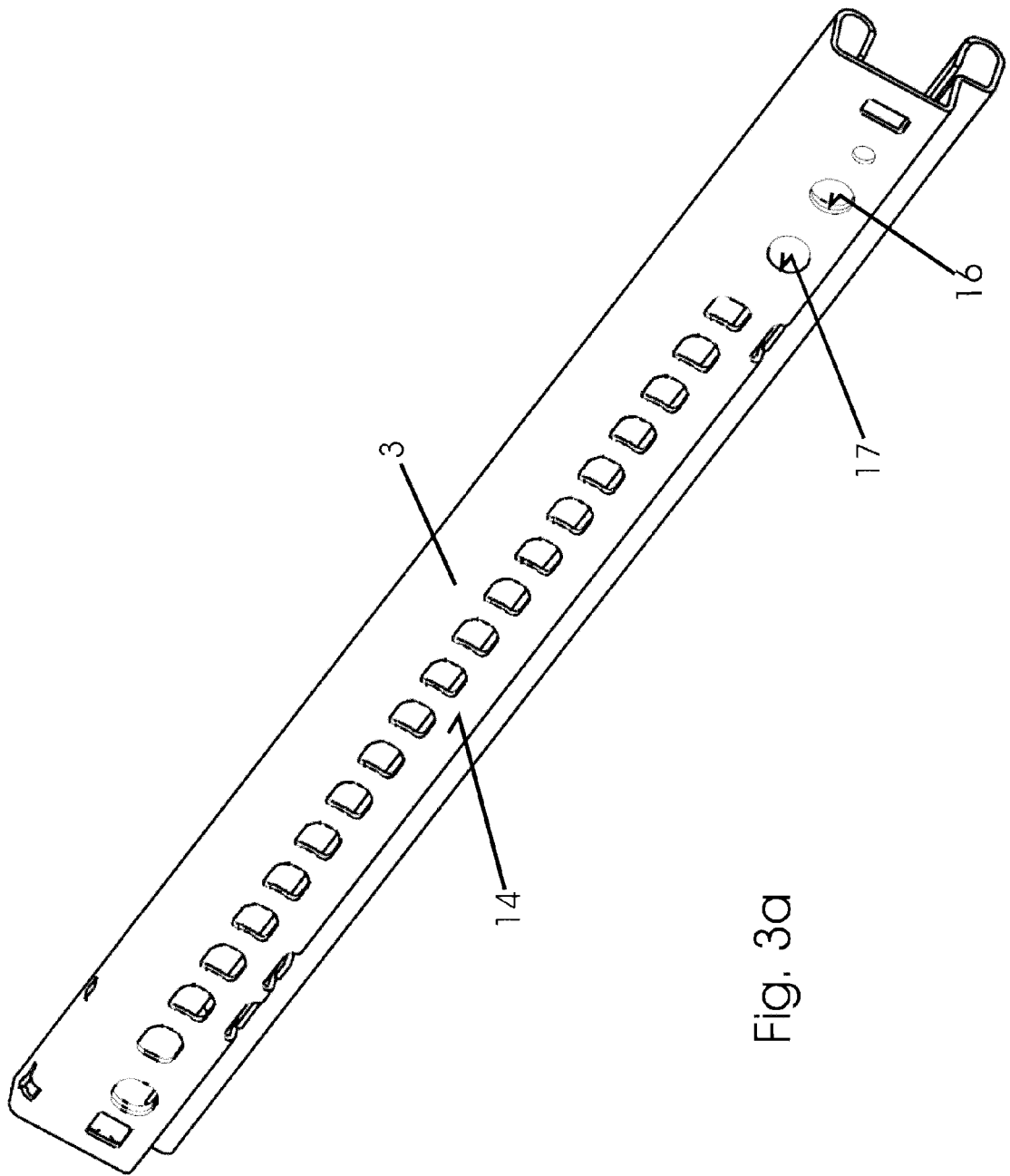
FIG. 3*a* shows a perspective view of a lower side of the lower rail from FIG. 2.
Figure 3B:
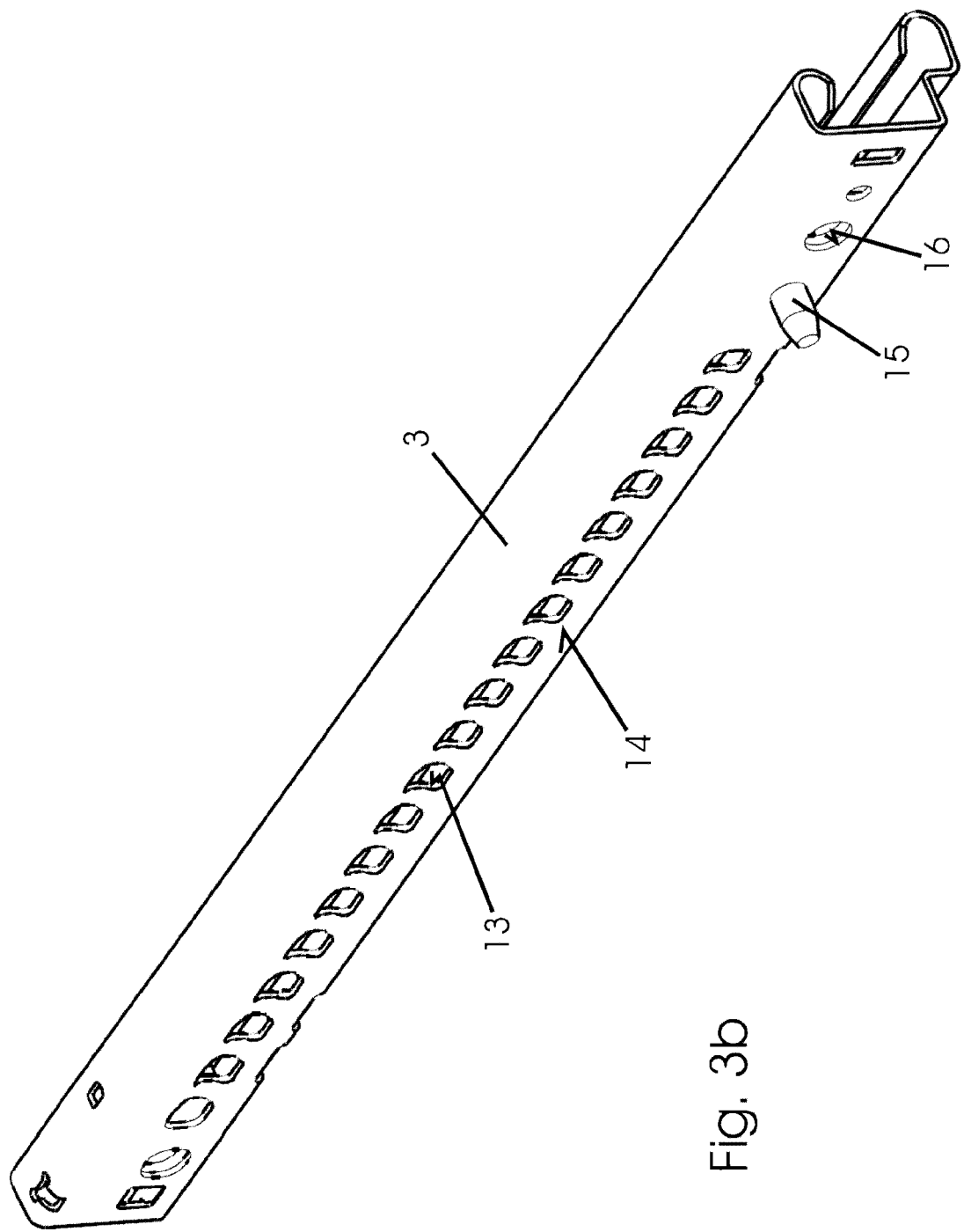
FIG. 3*b* shows a further perspective view of the lower rail from FIG. 2 with a fastening element projecting from the lower side.
Figure 4B:
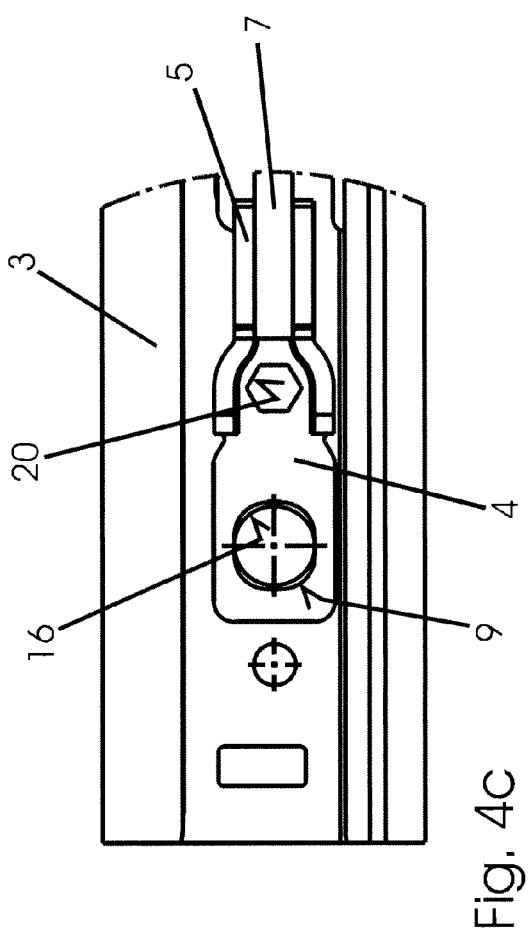
FIG. 4*b* shows a further perspective view of a partial region of the seat rail from FIG. 1 in section to some extent.
Figure 4A:
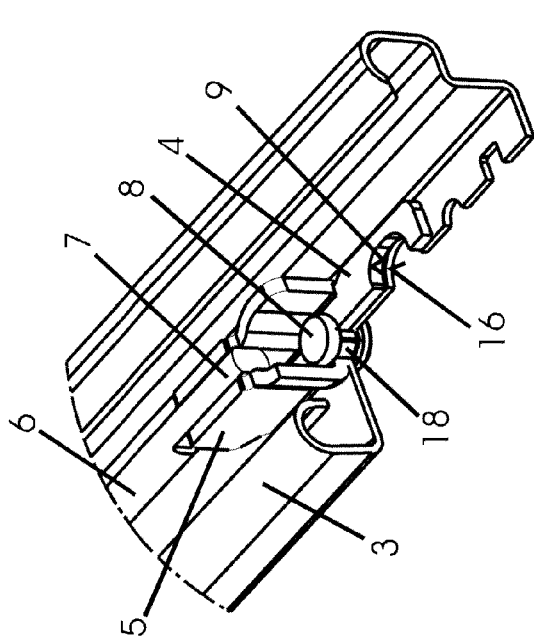
FIG. 4*a* shows a perspective view of a partial region of the seat rail from FIG. 1.
Figure 4C:
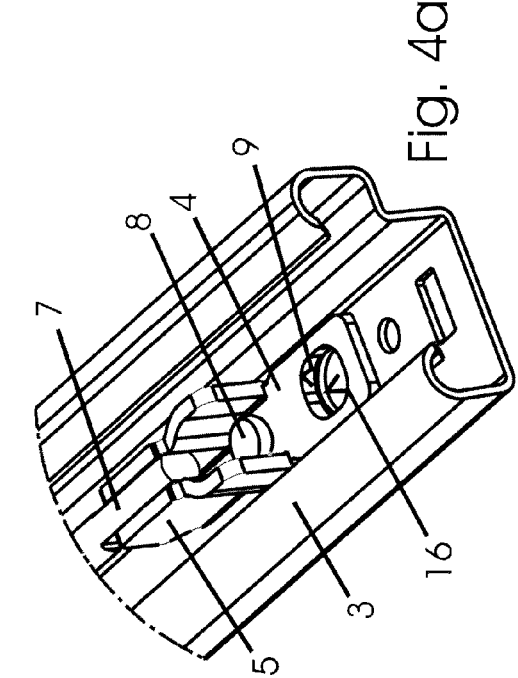
FIG. 4*c* shows a top view of the partial region of the seat rail of FIG. 1 shown in FIGS. 4*a* and 4*b*.

FIG. 1 shows an exemplary embodiment of a seat rail 1 having an upper rail 2 that can be connected to a motor vehicle seat and a lower rail 3 that can be connected to a floor of a vehicle.

For longitudinal adjustment of the motor vehicle seat, not shown here, with respect to the floor of the vehicle, also not shown, the upper rail 2 is mounted to the lower rail 3 in a longitudinally displaceable manner, wherein for comfortable longitudinal adjustment at the seat lower rail 2, using an adjusting device, a spindle 6 is mounted on the lower rail 3 in a rotationally fixed manner via a spindle retainer 4 and a spindle receptacle 11.

The spindle 6 in interaction with a driven spindle nut of the adjusting device, not shown here, allows the upper rail 2 to be displaced with respect to the lower rail 3 in a motor-driven manner. Such adjustability represents an increase in comfort compared to manual longitudinal adjustment, for securing the positioning of which indentations 13 are provided on the lower rail 3 that in the case of motor-driven adjustability are however without function.

One end of the spindle 6 is fastened to a spindle receptacle 11, which is fastened to the lower rail 3 in a rotationally fixed manner using stampings 12. On the other end, the spindle 6 is connected via a spindle retainer 4 to the lower rail 3, wherein the spindle retainer 4 has a first fastening opening 20 and a second fastening opening 9, and the lower rail 3 has a first fastening opening 17 and a second fastening opening 16 (see FIGS. 2-4*c*).

The first fastening openings 20, 17 and the second fastening openings 9, 16 are arranged aligned to each other in the installation position of the spindle retainer 4 on the lower rail 3. The first fastening openings 20, 17 have a polygonal, namely a hexagonal, cross-section and allow the arrangement of a correspondingly shaped fastening element 8, 8' in the shape of a connection rivet, which in a connection section 18 has a corresponding hexagonal cross-section. The fastening rivet 8, 8' extends through the first fastening openings 20, 17 and due to the polygonal cross-section of the connection section 18 and the corresponding design of the fastening openings 20, 17, prevents a rotation of the spindle retainer 4 with respect to the lower rail 3.

An appropriate lock against rotation is particularly advantageous when a fastening bolt 10, by means of which the seat rail 1 is fastened to a vehicle floor, extends through the second fastening openings 9, 16 and is bolted to the vehicle floor, because during tightening of the fastening bolt 10, due to the friction between the fastening bolt 10 and the spindle retainer 4, torque is created that can lead to a rotation of the spindle retainer 4 and as a consequence can lead to bending of the spindle 6, which in turn results in stiffness.

For arranging the spindle 6 locked against rotation on the spindle retainer 4, the spindle retainer 4 has a U-shaped receiving section 5, which with the free limbs surrounds a flattened connection section 7 of the spindle 6.

Figure 5B:
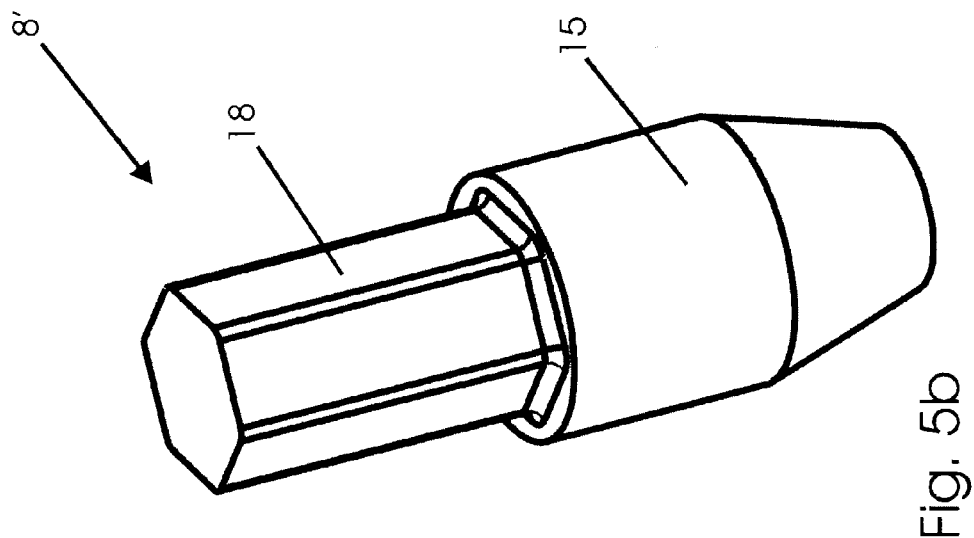
FIG. 5*b* shows a second embodiment of a fastening element having a polygonal connection cross-section and a peg connected thereto.
Figure 5A:
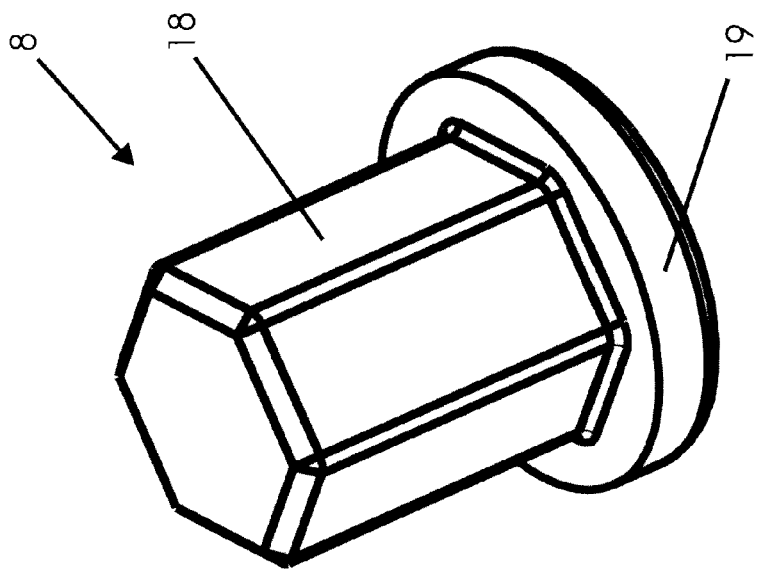
FIG. 5*a* shows a first embodiment of a fastening element having a polygonal connection cross-section.

For fastening, the fastening element designed as a rivet 8, 8' can have any design provided that using the connection section 18 it is guaranteed that a lock against rotation is present. According to an embodiment shown in FIG. 5a, the fastening means is designed as a rivet 8 which with the connection section 18 thereof rests in the first fastening openings 20, 17 of the spindle retainer 4 and the lower rail 3, wherein the positioning is secured using the rivet head 19. FIG. 5b shows a second embodiment of a fastening element, wherein the fastening rivet 8' has a peg 15, having a tapering cross-section, that is attached to the connecting section 18. In the installation position, the peg 15, as can be seen particularly in FIG. 3b, projects from the lower side 14 of the lower rail 3 and allows the rivet 8' along with a lock against rotation also to be used for positioning the seat rail 1 on the vehicle floor. Here, the cross-section of the peg 15 tapering in the end region serves as an assembly aid.

The invention claimed is:

1. A seat rail for a motor vehicle seat, comprising:
    a lower rail, which can be connected to a motor vehicle;
    a fastening element that includes an upper connection section and a peg, wherein an outer circumference of the upper connection section and an outer circumference of the peg are different;
    a spindle retainer; and
    a spindle, which is arranged on the lower rail in a rotationally fixed manner by the spindle retainer,
    wherein the spindle retainer is fixed to the lower rail via the fastening element extending through a fastening opening in the spindle retainer and a fastening opening in the lower rail,
    wherein at least one of the fastening opening in the spindle retainer, the fastening opening in the lower rail, and/or the upper connection section of the fastening element have a cross-section deviating from a circular shape,
    wherein the upper connection section of the fastening element is arranged within and engages with the fastening opening in the spindle retainer and the fastening opening in the lower rail,
    wherein the peg includes a lower connection section,
    wherein the peg projects from a side of the lower rail that is opposite the spindle retainer and extends from the upper connection section of the fastening element,
    wherein the peg is formed as a first fastening bolt and is configured to fix the spindle retainer and the lower rail to the vehicle structure.

2. The seat rail according to claim 1, wherein the fastening element is formed by a connection rivet.

3. The seat rail according to claim 1, wherein the upper connection section has a quadrangular cross-section.

4. The seat rail according to claim 1, wherein at least one of a tapered region of the peg is positioned toward the free end of the peg and/or the peg has a polygonal cross-section.

5. The seat rail according to claim 1, wherein the spindle retainer and the lower rail each have a second fastening opening arranged corresponding to each other, which are designed for receiving a second fastening bolt for fixing the seat rail to the vehicle structure.

6. The seat rail according to claim 1, wherein the spindle retainer has a U-shaped receiving section for receiving the spindle locked against rotation.

7. The seat rail according to claim 6, wherein the fastening element is arranged within the U-shaped receiving section, wherein the U-shaped receiving section has two parallel extensions that enclose sides of a top portion of the fastening element and at least a portion of the spindle.

8. The seat rail according to claim 1, wherein the peg includes a tapered region extending from the lower connection section.

9. A seat rail for a motor vehicle seat, comprising:
    a lower rail, which can be connected to a motor vehicle; and
    a spindle, which is arranged on the lower rail in a rotationally fixed manner by a spindle retainer, wherein the spindle retainer is fixed to the lower rail via a fastening element extending through a fastening opening in the spindle retainer and a fastening opening in the lower rail,
    wherein the fastening element comprising an upper connection section and a peg that includes a lower connection section,
    wherein at least one of the fastening opening in the spindle retainer, the fastening opening in the lower rail, and/or the upper connection section of the fastening element have a cross-section deviating from a circular shape in a connection section, arranged in the region of the fastening openings,
    wherein the peg projects from a side of the lower rail opposite the spindle retainer and is attached to the upper connection section of the fastening element,
    wherein the peg is formed as a fastening bolt for fixing the spindle retainer and the lower rail to the vehicle structure.

* * * * *